March 5, 1957  J. R. ROSS  2,784,134
METHOD OF MANUFACTURING COMPOSITE PANELS
Filed Oct. 30, 1952  2 Sheets-Sheet 1
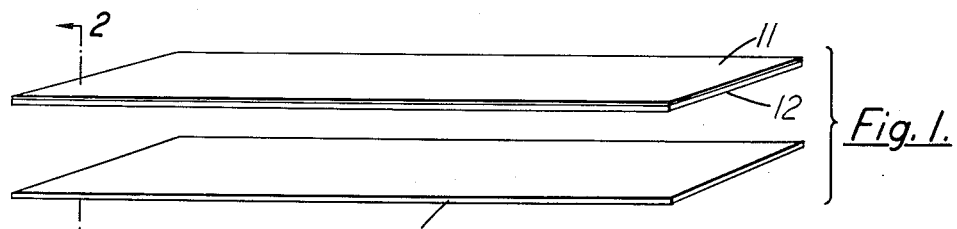
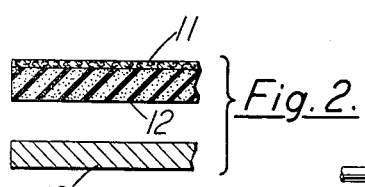
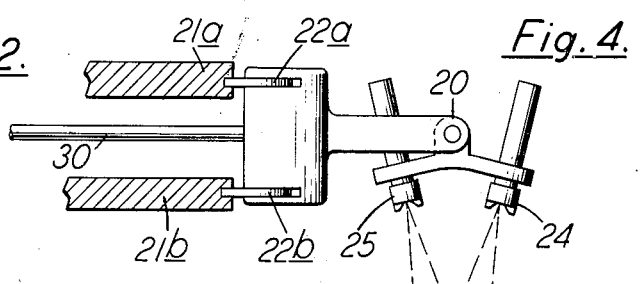
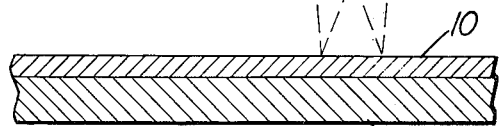
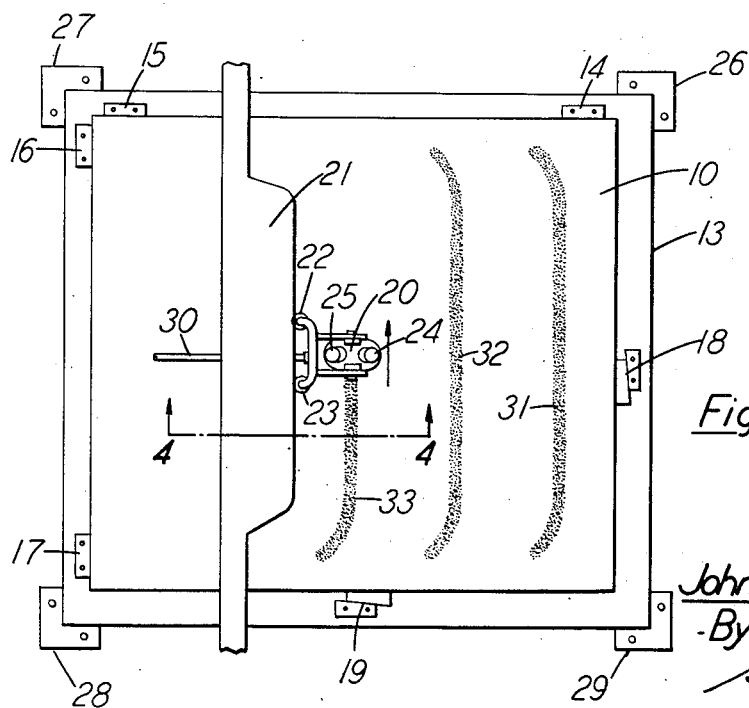
Inventor
John Ronald Ross
By
Glenn B. Wong
Attorney

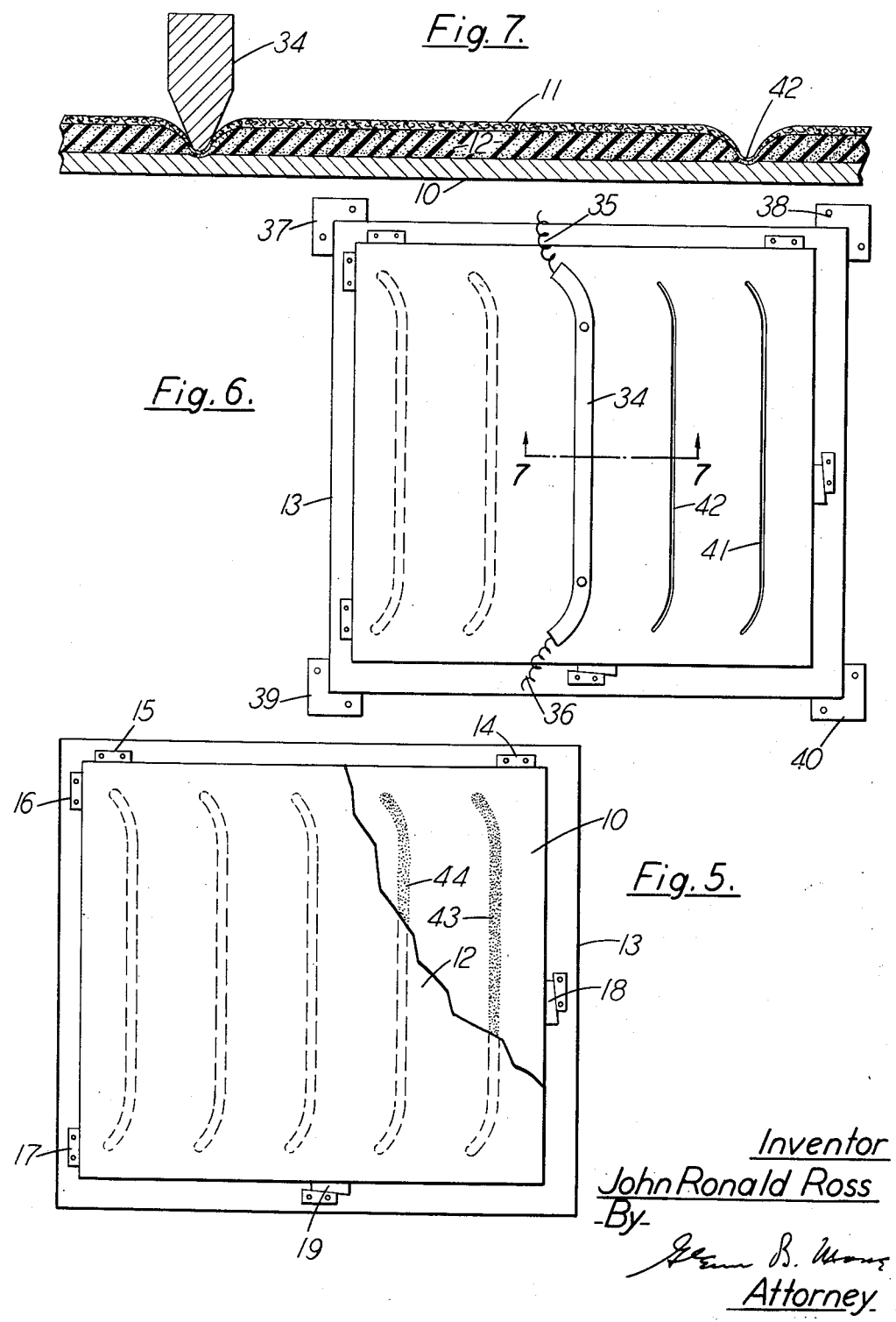

United States Patent Office 2,784,134
Patented Mar. 5, 1957

2,784,134

METHOD OF MANUFACTURING COMPOSITE PANELS

John Ronald Ross, Ionia, Mich., assignor to Ionia Manufacturing Company, Ionia, Mich.

Application October 30, 1952, Serial No. 317,635

1 Claim. (Cl. 154—106)

The present invention provides a method of manufacturing composite panels. Panels of the general type discussed herein have become standard equipment in the interiors of automobiles, forming the side areas of the passenger compartments. Essentially, these panels consist of a structural base panel establishing the necessary strength and rigidity, a layer of padding of fibrous or some other convenient composition, and a layer of covering material forming the outer exposed surface. The bonding of these components together is conventionally accomplished through the use of adhesive applied either to the base panel or to the padding, the adhesive serving to bond the covering material to the base panel through the padding at points where the padding has been densely compacted through pressure.

The present invention provides a method for applying adhesive solely to the areas where a seam line is to be established, and therefore avoids the wastage following from covering a larger area. In order to properly locate the operations so that the seam lines will be established where the adhesive has been applied, the base panel preferably is first placed in a reference member and securely mounted there. The reference member is then placed in the adhesive-applying machine, which serves to spray the adhesive along certain predetermined paths, the position of which is fixed with respect to locating means adapted to cooperate with the reference member. The reference member may be omitted, and the locating means adapted to operate directly on the base panel, but less accurate positioning is likely to result. This is due to manufacturing variations in the shape of the base panel, and to possible damage to the panel caused by the pressure of the locating means. After the spraying operation, the reference member containing the base panel (and also the padding, if the spraying has been performed on the padding rather than directly on the base panel) is removed and placed in a press having die members disposed to coincide with the lines where the adhesive has been deposited. The press has a similar set of locating means to that of the spraying machine, resulting in placing the die members accurately over the adhesive areas. Prior to the application of pressure, a sheet of covering material is placed over the padding. Application of pressure to the die members under adhesive-curing conditions result in establishing the "seam" lines desirable for structural and decorative purposes on the side of the composite panel.

The particular features of the present invention will be analysed in detail through a discussion of the particular embodiments illustrated in the accompanying drawings. In these drawings, Figure 1 is an exploded view showing the relative position of the covering material, padding, and base panel, prior to the assembly of these elements together, Figure 2 illustrates an enlarged section showing the relationship of the components of the composite panel, before they have been compressed together.

Figure 3 is a plan view illustrating the mounting of the panel on a reference member, and the application of adhesive along predetermined lines.

Figure 4 is a section taken on the plane 4—4 of Figure 3, on an enlarged scale.

Figure 5 illustrates the position of the paths of sprayed adhesive underneath the layer of padding. A section of the padding is shown broken-away to show the deposit of adhesive directly on the panel.

Figure 6 illustrates the application of a die member to the assembly of base panel, padding, and covering member to establish a seam line.

Figure 7 is a section taken on the plane 7—7 of Figure 6, on an enlarged scale.

Referring to Figure 1, a base panel 10 is shown disposed below a layer of covering material 11 and a layer of padding 12, the covering material 11 and the padding 12 being in position to be superimposed upon the base panel 10. According to conventional practice, the base panel 10 is of a hard compressed fibrous character, and is commonly bonded together with an asphalt composition. The padding may be a loosely-collected layer of fibrous material of any description, and the covering material is conventionally fabric or some synthetic fabric substance.

The first step in the operation defined by the present invention is the mounting of the base panel 10 in a reference member or plate 13. The plate 13 is provided with the fixed locating blocks 14, 15, 16, and 17, and is also provided with the adjustable locking wedges as indicated at 18 and 19. The combination of the fixed and adjustable locking systems secures the panel 10 in a positive relationship with the reference plate 13.

With the panel assembled to the reference plate as shown in Figure 3, the plate is placed in an automatic spraying machine having a spray-gun carrier 20 and a movable cam member 21. The spray-gun carrier is provided with rollers as indicated at 22 and 23 for engagement with the cam member 21. Movement of the rollers along the cam member 21 with the spray-guns 24 and 25 in operation (air and adhesive-supply lines to the spray guns are not shown) causes a stripe of adhesive to be applied to the base panel 10 along predetermined lines. The positions of the cam member for the particular stripes are determined by suitable stops (not shown). With the reference plate held firmly in an established position on the spraying machine by the locating blocks 26, 27, 28, and 29, a definite location of the applied adhesive with respect to the base panel itself is established. Referring to Figure 4, the cam member 21 may conveniently be formed of upper and lower components 21a and 21b, each having a suitable groove to accommodate the rollers 22 and 23. In Figure 4, the rollers 22 may be considered as including the upper roller 22a and the lower roller 22b. A member 30 forms a convenient handle for moving and holding the spraying unit. It will be noted that the spray-guns 24 and 25 are oriented to direct their spray at substantially the same area from different angles. This arrangement assures a more adequate coverage, particularly when the padding is placed on the base panel prior to the application of the adhesive. Spray applied from different angles has a tendency to reach around the various superimposed fibers of the padding so as to assure a greater depth of adequate penetration. The retaining member 30 may be operated manually or by a convenient mechanism. As a result of the operation of the spraying machine, a series of stripes of adhesive as indicated at 31, 32, and 33 is applied to the base panel (or to the padding, if that type of operation has been used). It may be noted that a less elaborate arrangement for locating the path of adhesive can be used, such as a template located over the reference plate 13 and containing apertures corresponding to the stripes 31 and 32. The adhesive can be applied to the apertures by hand-operated equipment.

After completion of the spraying operation, the reference member 13 and the components secured to it are placed in a press having heated die members as indicated at 34. These members may be heated through the energy supplied by the electrical leads 35 and 36. The heat may be generated either through electrical resistance, or may be directly generated in the components of the panel through the application of high-frequency current. As in the application of the adhesive, the reference member 13 is securely located in the press member through the action of the locating blocks 37, 38, 39, and 40. As indicated in Figure 7, the application of pressure to the die member 34 under adhesive-setting conditions results in establishing the seam lines 41 and 42. As suggested above, the adhesive may be sprayed either directly on the base panel 10, or may be applied to the padding which has been deposited on top of the panel before application of adhesive. In either case, the adhesive permeates the padding at the seam lines, and establishes a bond uniting the covering material through the adhesive down to the base panel. Figure 5 illustrates in dotted lines the paths of application of the adhesive which have been applied directly to the base panel before positioning of the padding. A portion of the padding is shown broken away to indicate the paths or stripes or adhesive. The two stripes 43 and 44 correspond to the seams 41 and 42, respectively, as shown in Figure 6.

The particular embodiments of the present invention shown and described herein are for illustrative purposes only and are not to be considered as a limitation upon the scope of the appended claim. In this claim, it is my intention to claim the entire invention disclosed herein except as I am limited by the prior art.

I claim:

A process for manufacturing a composite panel having a hard compressed base panel, a layer of relatively loosely formed padding, and a layer of covering material, comprising: spraying a surface coating of adhesive on a base panel in a definite reproducible discontinuous pattern; first applying a layer of padding and a layer of covering material successively over said base panel; and then densely compacting said padding and covering material substantially exclusively in registry with said pattern and simultaneously applying heat to produce a bond conforming to said pattern between said panel, padding and covering material.

References Cited in the file of this patent

UNITED STATES PATENTS

| | | |
|---|---|---|
| 1,847,269 | Schur | Mar. 1, 1932 |
| 2,166,435 | Haberstump | July 18, 1939 |
| 2,236,968 | Cunnington | Apr. 1, 1941 |
| 2,369,658 | Burns | Feb. 20, 1945 |
| 2,428,979 | May | Oct. 14, 1947 |